(12) United States Patent  
Peirce

(10) Patent No.: US 7,690,032 B1  
(45) Date of Patent: Mar. 30, 2010

(54) METHOD AND SYSTEM FOR CONFIRMING THE IDENTITY OF A USER

(75) Inventor: Michael Peirce, Dublin (IE)

(73) Assignee: Daon Holdings Limited, George Town (KY)

( * ) Notice: Subject to any disclaimer, the term of this patent is extended or adjusted under 35 U.S.C. 154(b) by 0 days.

(21) Appl. No.: 12/470,781

(22) Filed: May 22, 2009

(51) Int. Cl.
G06F 7/04 (2006.01)
G06F 15/16 (2006.01)
G06F 17/30 (2006.01)
H04L 29/06 (2006.01)

(52) U.S. Cl. .......................... 726/9; 713/172; 713/173; 713/174; 380/229; 705/65; 705/66; 705/67; 705/68; 705/69

(58) Field of Classification Search .............. 726/9, 726/20; 380/229; 713/172–174; 705/65–69
See application file for complete search history.

(56) References Cited

U.S. PATENT DOCUMENTS

| | | | |
|---|---|---|---|
| 4,993,068 A | 2/1991 | Piosenka et al. | |
| 6,084,968 A | 7/2000 | Kennedy et al. | |
| 6,182,076 B1 | 1/2001 | Yu et al. | |
| 6,367,016 B1 | 4/2002 | Lambert et al. | |
| 6,434,259 B1 | 8/2002 | Hamid et al. | |
| 6,609,198 B1 | 8/2003 | Wood et al. | |
| 6,779,113 B1 | 8/2004 | Guthery | |
| 6,871,287 B1 * | 3/2005 | Ellingson ........................ 726/9 | |
| 6,892,307 B1 | 5/2005 | Wood et al. | |
| 7,039,812 B2 | 5/2006 | Kawan et al. | |
| 7,109,869 B2 | 9/2006 | Sweatte | |
| 7,117,359 B2 | 10/2006 | Wood et al. | |
| 7,161,465 B2 | 1/2007 | Wood et al. | |
| 7,178,025 B2 | 2/2007 | Scheidt et al. | |
| 7,185,193 B2 * | 2/2007 | Watanabe et al. .......... 713/155 | |
| 7,231,657 B2 | 6/2007 | Honarvar et al. | |
| 7,240,365 B2 * | 7/2007 | de Jong et al. ................. 726/9 | |
| 7,254,619 B2 | 8/2007 | Mekata et al. | |
| 7,260,558 B1 * | 8/2007 | Cheng et al. .................. 706/12 | |
| 7,263,347 B2 | 8/2007 | Engelhart | |
| 7,290,146 B2 | 10/2007 | Ekers et al. | |
| 7,318,050 B1 | 1/2008 | Musgrave | |

(Continued)

FOREIGN PATENT DOCUMENTS

EP 0 614 159 9/1994

(Continued)

*Primary Examiner*—Farid Homayounmehr
(74) *Attorney, Agent, or Firm*—Kevin McDermott, Esq.

(57) ABSTRACT

A method of confirming the identity of a user includes processing biometric credentials, generating a user configurable policy including identities of a plurality of authenticating entities, storing the user configurable policy in a device, presenting the device to an authenticating entity at an authentication station, and requesting biometric and personal data of the user from the device data. The biometric data corresponds to at least one biometric feature desired for authenticating the user and the requesting operation is performed by a workstation of the authenticating entity. Moreover, the method includes consulting the user configurable policy in response to the requesting operation to determine whether the requested biometric data is permitted to be released from the device data, and releasing the requested biometric and personal data from the device data to the authenticating entity when the default rule associated with the one authenticating entity permits releasing the requested biometric and personal data.

15 Claims, 6 Drawing Sheets

U.S. PATENT DOCUMENTS

| | | | |
|---|---|---|---|
| 7,325,128 B2 | 1/2008 | Wood et al. | |
| 7,353,396 B2 | 4/2008 | Micali et al. | |
| 7,366,892 B2 | 4/2008 | Spaur et al. | |
| 7,392,536 B2 | 6/2008 | Jamieson et al. | |
| 7,398,925 B2 | 7/2008 | Tidwell et al. | |
| 7,409,543 B1 | 8/2008 | Bjorn | |
| 7,426,642 B2 | 9/2008 | Aupperle et al. | |
| 7,428,637 B1 | 9/2008 | Billman et al. | |
| 7,428,750 B1 | 9/2008 | Dunn et al. | |
| 7,437,755 B2 | 10/2008 | Farino et al. | |
| 7,451,921 B2 | 11/2008 | Dowling et al. | |
| 7,451,924 B2 | 11/2008 | Bonalle et al. | |
| 7,496,952 B2 | 2/2009 | Edwards, Jr. et al. | |
| 7,512,235 B2 * | 3/2009 | Multerer et al. | 380/251 |
| 7,516,886 B2 | 4/2009 | Gangi | |
| 7,552,333 B2 | 6/2009 | Wheeler et al. | |
| 2003/0037264 A1 | 2/2003 | Ezaki et al. | |
| 2003/0051133 A1 | 3/2003 | Pearson | |
| 2003/0115475 A1 | 6/2003 | Russo et al. | |
| 2003/0117262 A1 | 6/2003 | Anderegg et al. | |
| 2003/0159052 A1 | 8/2003 | Lee et al. | |
| 2003/0172279 A1 | 9/2003 | Yudasaka | |
| 2003/0208684 A1 | 11/2003 | Camacho et al. | |
| 2004/0091136 A1 | 5/2004 | Dombrowski | |
| 2004/0133804 A1 | 7/2004 | Smith et al. | |
| 2004/0158723 A1 | 8/2004 | Root | |
| 2004/0177097 A1 | 9/2004 | Yu et al. | |
| 2004/0221174 A1 * | 11/2004 | Le Saint et al. | 713/201 |
| 2004/0230812 A1 | 11/2004 | Muller et al. | |
| 2005/0033991 A1 * | 2/2005 | Crane | 713/201 |
| 2006/0053296 A1 | 3/2006 | Busboom et al. | |
| 2006/0074986 A1 | 4/2006 | Mallalieu et al. | |
| 2006/0116970 A1 | 6/2006 | Scherzer et al. | |
| 2006/0136717 A1 | 6/2006 | Buer et al. | |
| 2006/0156394 A1 * | 7/2006 | Wlodarczyk | 726/9 |
| 2006/0206723 A1 | 9/2006 | Gil et al. | |
| 2006/0213982 A1 | 9/2006 | Cannon et al. | |
| 2006/0236119 A1 | 10/2006 | Bobbitt | |
| 2007/0016941 A1 | 1/2007 | Gonzalez et al. | |
| 2007/0022301 A1 | 1/2007 | Nicholson et al. | |
| 2007/0061272 A1 | 3/2007 | Delgrosso et al. | |
| 2007/0079136 A1 | 4/2007 | Vishik et al. | |
| 2007/0101413 A1 | 5/2007 | Vishik et al. | |
| 2007/0115940 A1 | 5/2007 | Kamen et al. | |
| 2007/0169182 A1 | 7/2007 | Wolfond et al. | |
| 2007/0186106 A1 | 8/2007 | Ting et al. | |
| 2007/0289000 A1 | 12/2007 | Weiss | |
| 2007/0291996 A1 | 12/2007 | Hoffman et al. | |
| 2008/0002861 A1 | 1/2008 | Yano et al. | |
| 2008/0028453 A1 * | 1/2008 | Nguyen et al. | 726/9 |
| 2008/0046984 A1 | 2/2008 | Bohmer et al. | |
| 2008/0048026 A1 | 2/2008 | Gangi | |
| 2008/0056544 A1 | 3/2008 | Aikawa et al. | |
| 2008/0059804 A1 | 3/2008 | Shah et al. | |
| 2008/0109883 A1 | 5/2008 | Hernoud et al. | |
| 2008/0141339 A1 | 6/2008 | Gomez et al. | |
| 2008/0148059 A1 | 6/2008 | Shapiro | |
| 2008/0224823 A1 | 9/2008 | Lawson et al. | |
| 2008/0282334 A1 | 11/2008 | Yves et al. | |
| 2008/0289020 A1 * | 11/2008 | Cameron et al. | 726/9 |
| 2008/0307488 A1 * | 12/2008 | Hammond et al. | 726/1 |
| 2008/0313719 A1 | 12/2008 | Kaliski, Jr. et al. | |
| 2008/0319915 A1 | 12/2008 | Russell et al. | |
| 2009/0065572 A1 | 3/2009 | Jain | |
| 2009/0079538 A1 | 3/2009 | Fein et al. | |
| 2009/0132813 A1 | 5/2009 | Schibuk | |

FOREIGN PATENT DOCUMENTS

| | | |
|---|---|---|
| EP | 1 898 370 | 3/2008 |
| WO | WO 03/058548 | 7/2003 |
| WO | WO 2008/091277 A2 | 7/2008 |

* cited by examiner

| CRED. | BIOMETRIC DATA & SECURITY FEATURE L1 | | SECURITY FEATURE & PERSONAL DATA |
|---|---|---|---|
| FIRST | FINGER, FACE | DIG. SIG. 1 ≠ | DIG. SIG. 1 | AGE |
| SECOND | IRIS L2 | DIG. SIG. 2 ≠ | DIG. SIG. 2 | PHONE NO. |
| THIRD | FINGER, VASCULAR | DIG. SIG. 3 ≠ | DIG. SIG. 3 | BIRTH DATE |
|  |  |  | L3 |  |

FIG. 4

| CRED. | BIOMETRIC DATA & SECURITY FEATURE | | SECURITY FEATURE & PERSONAL DATA |
|---|---|---|---|
| FIRST | FINGER, FACE | DIG. SIG. 1 ≠ DIG. SIG. 1 | AGE |
| FIRST | FINGER, FACE L4 | DIG. SIG. 4 ≠ DIG. SIG. 4 | PHONE NO. BIRTH DATE |
| SECOND | IRIS | DIG. SIG. 2 ≠ DIG. SIG. 2 | PHONE NO. |
|  | IRIS L5 | DIG. SIG. 5 ≠ DIG. SIG. 5 | AGE BIRTH DATE |
| THIRD | FINGER, VASCULAR | DIG. SIG. 3 ≠ DIG. SIG. 3 | BIRTH DATE |
| THIRD | FINGER, VASCULAR | DIG. SIG. 6 ≠ DIG. SIG. 6 | AGE PHONE NO. |

FIG. 5

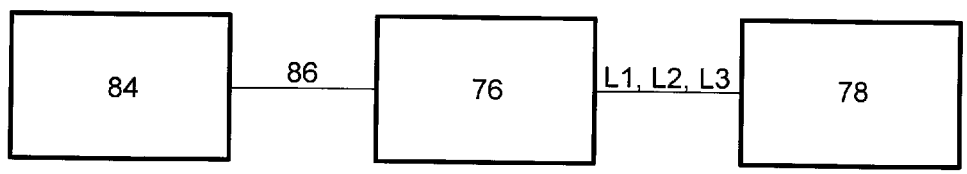

FIG. 6

METHOD AND SYSTEM FOR CONFIRMING THE IDENTITY OF A USER

BACKGROUND OF THE INVENTION

This invention relates generally to authenticating individuals using identity credentials, and more particularly, to a method and system for confirming the identity of a user in possession of a device.

Governments and private sector entities have been known to issue several different types of credentials. Generally, credentials are physical objects that include data stored therein that is used to prove the identity of an individual. For example, Governments have been known to issue primary identity credentials such as electronic-passports (e-passports), national identification (ID) cards, driver licenses, and entitlement cards that each contains biometric identity data. Private sector entities such as employers, airports authorities, and banks have been known to issue credentials such as employee identity cards, registered traveler cards, and banking cards, respectively, that each contain biometric identity data.

Individuals have been known to simultaneously carry several different biometric identity credentials such as e-passports, driver's licenses, entitlement cards, employee identity cards and physical access cards as separate individual biometric identity credentials. Moreover, several different versions of an individual's biometric data may be created and authorized by different independent entities because governments and private sector entities use different systems to create their own separate biometric identity credentials. Furthermore, these systems are generally not configured to communicate with each other or with credentials issued by a different system. As a result, the biometric identity data of one issuing entity's system is generally not recognizable by another entity's system. Thus, a credential issued by one entity may not be used by another entity to confirm the identity of the bearer of the credential.

Known methods and systems for issuing biometric identity credentials typically require that each issuing entity separately collect enrollment biometric data, use the data to perform large-scale identification (1:N) background searches across multiple databases, and issue a biometric identity credential that is compatible with the issuing entity's system. Thus, known methods may be costly due to significant investment in identity system infrastructure and continuing costs due to issuing, re-issuing and revoking credentials. Moreover, according to known methods, private sector entities duplicate government investment and effort when capturing and analyzing biometric data.

BRIEF DESCRIPTION OF THE INVENTION

In one aspect, a method of confirming the identity of a user is provided. The method includes processing biometric credentials having biometric and personal data stored therein, and storing the processed biometric and personal data on a device as device data. Moreover, the method includes generating a user configurable policy including identities of a plurality of authenticating entities. Each of the authenticating entities is associated with one of a plurality of levels of trust and a predetermined default rule corresponding to the one level of trust. The predetermined default rule is one of a plurality of default rules that are configured to release a portion of the device data in accordance with a corresponding one of the levels of trust. Furthermore, the method includes storing the user configurable policy in the device, presenting, by a user in possession of the device, the device to one of the authenticating entities at an authentication station, and requesting biometric and personal data of the user from the device data. The biometric data corresponds to at least one biometric feature desired for authenticating the user, and the requesting operation is performed by a workstation of the one authenticating entity. Additionally, the method includes consulting the user configurable policy in response to the requesting operation to determine whether the requested biometric data is permitted to be released from the device data, and releasing the requested biometric and personal data from the device data to the one authenticating entity when the default rule associated with the one authenticating entity permits releasing the requested biometric and personal data.

The method also includes validating a logical link between the user in possession of the device and the released personal data by establishing a logical link between the released personal data and the released biometric data, by certifying that a biometric security feature associated with the released biometric data and a personal security feature associated with the released personal data have not been modified and were issued in an originally processed credential by a suitable issuer. The validating operation also includes authenticating a biometric link between the user and the released biometric data by comparing the released biometric data against actual biometric data captured from the user in possession of the device. The method also includes displaying a message after the validating operation indicating a result of the validating operation.

In another aspect, a system for confirming the identity of a user is provided. The system includes at least one computer configured as a server that includes a database and at least one workstation positioned at an authenticating station. The workstation includes at least a workstation computer operationally coupled to a biometric credential reading device, wherein the server and the at least one workstation communicate. Moreover, the system includes a device having stored therein a set of biometric data and a set of personal data as device data, wherein each item of biometric data included in the set of biometric data corresponds to an item of personal data included in the set of personal data such that each item of biometric data is associated with a biometric security feature and each item of corresponding personal data is associated with a personal security feature.

The device is configured to store a user configurable policy including identities of a plurality of trusted authenticating entities. Each of the trusted authenticating entities is associated with one of a plurality of levels of trust and a default rule corresponding to the one level of trust, and the default rule is one of a plurality of default rules that permit releasing a portion of the device data in accordance with a corresponding one of the levels of trust, wherein each item of biometric data includes at least one representation of a biometric feature of an individual. Moreover, the device is configured to consult the user configurable policy in response to a request for biometric and personal data, to determine whether the requested biometric and personal data are permitted to be released from the device data, and to release the requested biometric and personal data from the device data when an appropriate one of the default rules permits releasing the requested biometric and personal data.

In yet another aspect, a universal biometric credential device for confirming the identity of a user at an authenticating station is provided. The universal biometric credential device includes a computer-readable recording medium configured to store a user configurable policy including a plurality of trusted authenticating entities. Each of the trusted authenticating entities is associated with one of a plurality of levels of trust and a default rule corresponding to the one level of trust, and each of the default rules permits releasing a portion of the device data in accordance with the corresponding level of trust, wherein each item of biometric data includes at least one representation of a biometric feature of an individual.

Moreover, the universal biometric credential device includes a processor configured to receive a request from each of the trusted authenticating entities for biometric and personal data stored in the universal biometric credential device. The processor is also configured to consult the user configurable policy in response to the request to determine whether the requested biometric and personal data are permitted to be released from the universal biometric credential device, and is configured to release the requested biometric and personal data from the universal biometric credential device when an appropriate one of the default rules permits releasing the requested biometric and personal data.

BRIEF DESCRIPTION OF THE DRAWINGS

FIG. 4 is a diagram that represents data as stored in a carrying device;

FIG. 5 is another diagram that represents data as stored in the carrying device;

FIG. 6 is a simplified block diagram illustrating exemplary relationships established during authentication;

DETAILED DESCRIPTION OF THE INVENTION

Figure 1:
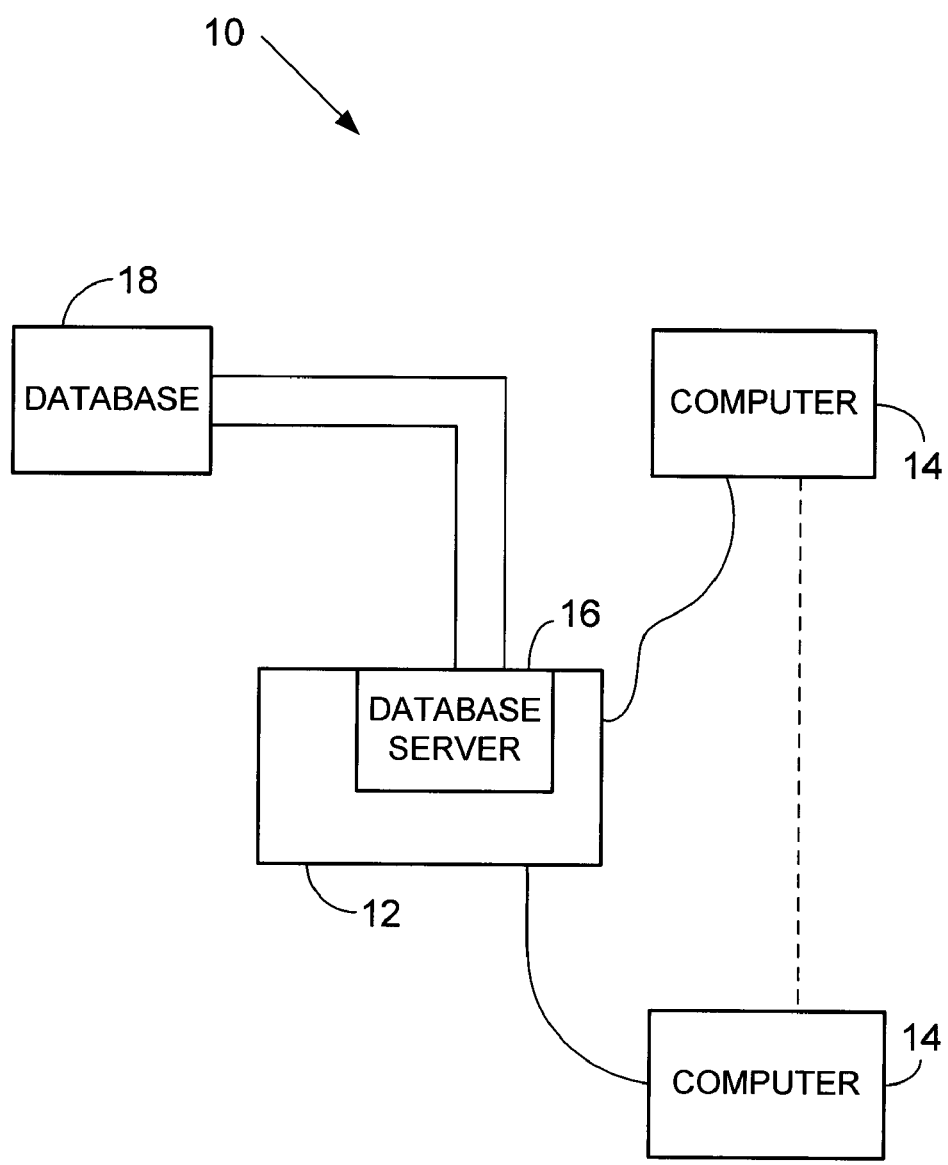
FIG. 1 is a simplified block diagram of an exemplary embodiment of a computer system used for authenticating a user in possession of a universal biometric credential.

FIG. 1 is a simplified diagram of a computer system 10 including a server system 12, and a plurality of client subsystems, also referred to as end user computer systems 14, connected to server system 12. Computer system 10 is used for confirming the identity of a user as described herein. Computerized modeling and grouping tools, as described below in more detail, are stored in server 12 and can be accessed by an operator at any one of end user computer systems 14. A database server 16 is connected to a database 18 containing information on a variety of matters, as described below in greater detail. In one embodiment, centralized database 18 is stored on server system 12 and can be accessed by potential end users at one of end user computer systems 14 by logging onto server system 12 through one of end user computer systems 14. In an alternative embodiment, database 18 is stored remotely from server system 12 and may be non-centralized. It should be appreciated that in the exemplary embodiment, database 18 may be any kind of data storage.

Figure 2:
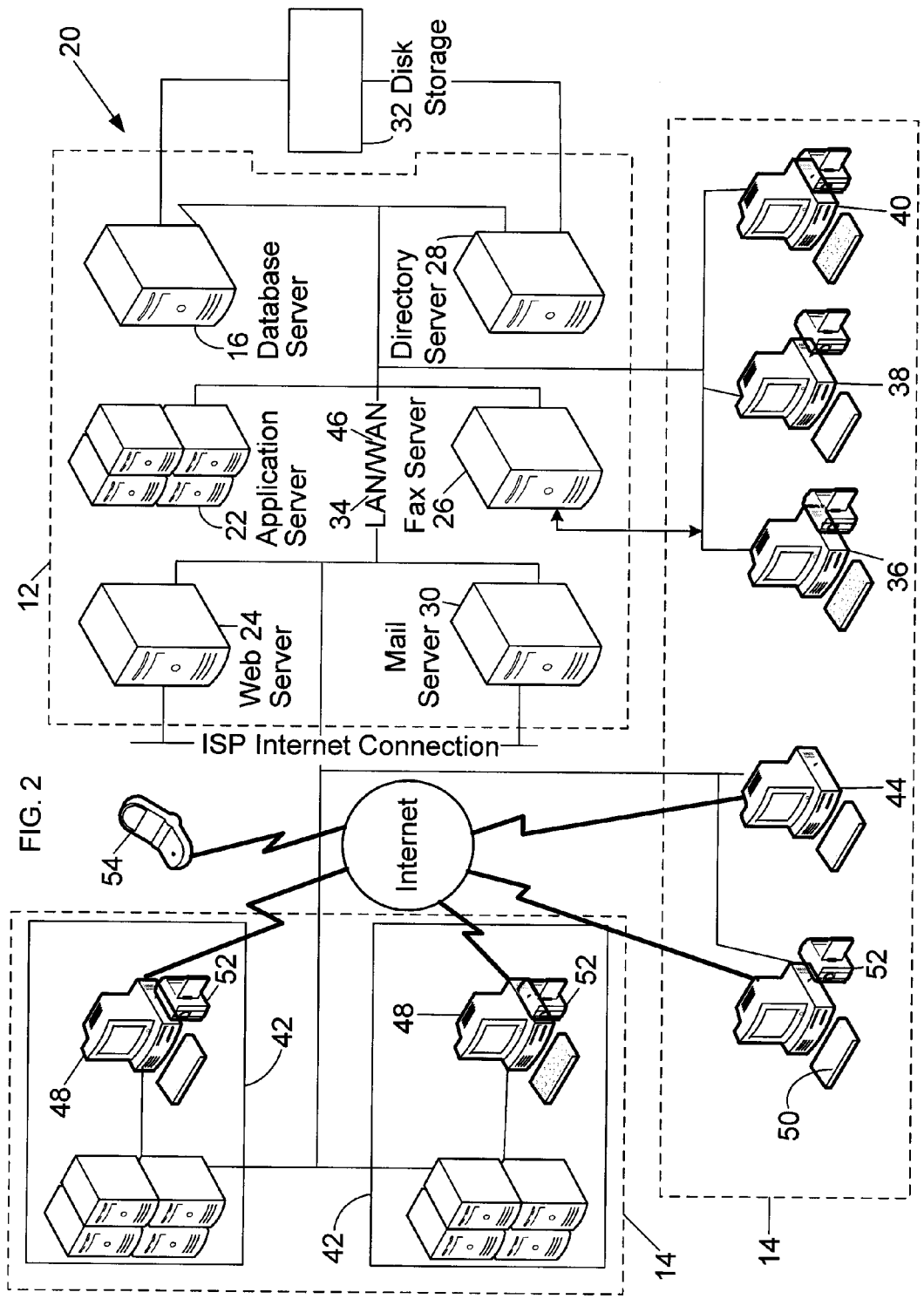
FIG. 2 is an expanded block diagram of an exemplary embodiment of a server architecture of the computer system shown in FIG. 1.

FIG. 2 is an expanded block diagram of an exemplary embodiment of a server architecture of a computer system 20. Components in system 20, identical to components of system 10 (shown in FIG. 1), are identified in FIG. 2 using the same reference numerals as used in FIG. 1. Computer system 20 includes server system 12 and end user computer systems 14. Server system 12 further includes database server 16, an application server 22, a web server 24, a fax server 26, a directory server 28, and a mail server 30. Disk storage unit 32 is coupled to database server 16 and directory server 28. Servers 16, 22, 24, 26, 28 and 30 are coupled in a local area network (LAN) 34. In addition, a system administrator's workstation 36, a user workstation 38, and a supervisor's workstation 40 are coupled to LAN 34. However, in other embodiments, the servers 16, 22, 24, 26, 28, 30 and the workstations 36, 38, 40 may be coupled in a wide area network (WAN) 46.

Server system 12 is configured to be communicatively coupled to various individuals, including employee end users 42 and to third party end users including, but not limited to, clients/customer computers 44 and client universal biometric carrying devices 54, using the internet. However, in other embodiments, system 12 may be communicatively coupled to employee end users 42 and third party end users 44 using the LAN 34 or the WAN 46.

In the exemplary embodiment, any authorized individual having a workstation 48 can access computer system 20. At least one of the end user computer systems 14 includes a manager workstation 50. Workstations 48 and 50 are personal computers configured to communicate with server system 12. Furthermore, fax server 26 communicates with end user computer systems 14, including manager workstation 50 using a telephone link. Fax server 26 is configured to communicate with other end users 36, 38 and 40 as well.

Workstations 36, 38, 40, 48 and 50 include computers that may include devices for reading biometric data from computer-readable recording media, such as a compact disc-read only memory (CD-ROM), a magneto-optical disc (MOD), a digital versatile disc (DVD) and a universal serial bus (USB) device. Additionally, it should be understood that the computers included in the workstations 36, 38, 40, 48 and 50 include memory (not shown). Moreover, workstations 36, 38, 40, 48 and 50 include display devices, such as, but not limited to, liquid crystal displays (LCD), cathode ray tubes (CRT) and color monitors. Furthermore, workstations 36, 38, 40, 48 and 50 include printers and input devices such as, but not limited to, a mouse (not shown), keypad (not shown), a keyboard, a microphone (not shown), and a universal biometric credential reading device 52. In the exemplary embodiment, the reading device 52 is any kind of smart card reader. However, it should be appreciated that in other embodiments, the reading device 52 may be any device that facilitates reading multiple existing identity credentials from a universal biometric credential. Such devices include, but are not limited to, a barcode reader, a document scanner, and any kind of contactless reader. Moreover, in other embodiments, the reading device 52 may be replaced by security personnel that manually read and collect identity credentials and identity credential data.

Application server 22 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that computer programs, or instructions, are stored on a computer-readable recording medium, such as server 22 memory (not shown), and are executed by the processor. The above examples are exemplary only, and are thus not intended to limit in any way the definition and/or meaning of the term "processor."

The memory (not shown) in application server 22, and the memory in the computers of workstations 36, 38, 40, 48 and 50. can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of application server 22, and the memory of the computers included in the workstations 36, 38, 40, 48 and 50, is used to store executable instructions, or computer programs, thereon. The term "computer program" is intended to encompass an executable program that exists permanently or temporarily on any computer-readable recordable medium that causes the computer or computer processor to execute the program.

The universal biometric carrying device 54 of the exemplary embodiment is a cellular phone capable of storing biometric data and personal data in a universal format. However, it should be appreciated that in other embodiments, the carrying device 54 may be any personal device capable of storing biometric and personal data in the universal format such as, but not limited to, a smart phone, any type of portable communications device having wireless capabilities such as a personal digital assistant (PDA), and a USB device. Moreover, in other embodiments, the biometric and personal data may optionally be stored in any combination of personal devices that are each capable of storing biometric and personal data in the universal format, or may optionally be stored in the system 20, such that the biometric and personal data are accessible over a data network. It should be understood that the biometric carrying device 54 includes at least a processor (not shown) and a memory (not shown). The memory can be a computer-readable recording medium used to store at least biometric data in the universal format, and store computer programs or executable instructions that are executed by the carrying device 54. Moreover, the memory (not shown) may include ROM, RAM, PROM, EPROM, smart card, SIMs, WIMs or any other medium from which a computing device can read computer programs or executable instructions.

Figure 3:
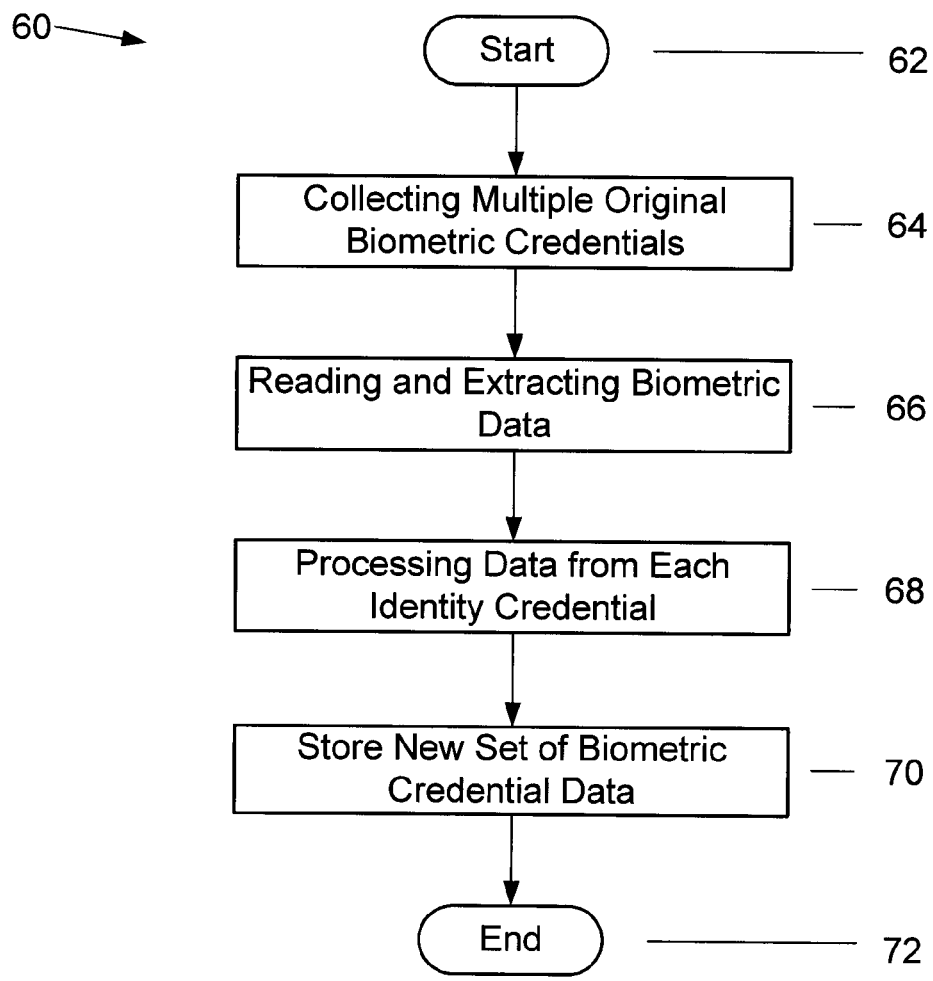
FIG. 3 is a flowchart illustrating an exemplary process for generating a universal biometric credential.

FIG. 3 is a flowchart 60 illustrating an exemplary process for generating a universal biometric credential in accordance with an embodiment of the invention. The method starts 62 by collecting a plurality of original biometric credentials and personal data belonging to an individual. In the exemplary embodiment, the plurality of original biometric credentials includes first, second and third credentials. The first credential is an electronic passport (e-passport) and includes biometric data corresponding to fingerprint and face data of the individual. The second credential includes biometric data corresponding to iris data of the individual, and the third credential also includes fingerprint data as well as vascular data of the individual. In the exemplary embodiment the face biometric data is a face photo. However, in other embodiments the face biometric data may include any data that relates to an individual's face such as, but not limited to, electronic data that represents the contours of the individual's face. The fingerprint data and iris data may be in any form that facilitates authenticating the individual, such as, but not limited to, images, templates and electronic data representations. Moreover, it should be understood that any biologic feature may be included as biometric data in a biometric credential, and that the biometric data may take any form such as, but not limited to, images, photographs, templates and electronic data representations. Furthermore, it should be appreciated that as used herein biometric credentials may be any physical object that includes data stored therein which is used to prove the identity of an individual such as, but not limited to, e-passports, national identification cards, drivers licenses, entitlement cards, employee identity cards and banking cards.

After collecting the original biometric credentials 64, the biometric data and personal data included in each of the original credentials are read and extracted 66 by the biometric credential reading device 52. Security features are generally applied to the biometric data and to the personal data by the original issuer of the original biometric credential. Thus, reading and extracting 66 the biometric data and personal data also includes determining whether or not corresponding original security features are included in the biometric and personal data, extracting the original security features with the biometric and personal data, and ensuring that these security features are valid. Validating a security feature of the biometric data and a security feature of the personal data ensures that the extracted biometric data and extracted personal data are trustworthy, have not been modified, and were issued in an original biometric credential by a trustworthy or dependable issuer.

It should be appreciated that the term "personal data" as used herein includes any demographic information regarding an individual as well as detail information pertinent to the individual. Such demographic information includes, but is not limited to, an individual's name, age, date of birth, address, citizenship and marital status. Moreover, detail information includes, but is not limited to, contact details such as telephone numbers, and the purpose of the original credential. For example, when the original credential is a payment card the purpose of the payment card is to make payment transactions.

In the exemplary embodiment, the biometric data and the personal data are each encrypted with a same electronic security feature in the form of a digital signature. Although the exemplary embodiment uses digital signatures as the electronic security feature, it should be appreciated that in other embodiments the security feature may be any type of electronic security feature that facilitates ensuring the extracted biometric data and extracted personal data are proper and trustworthy as described herein. Moreover, it should be understood that in other embodiments the extracted biometric data and the extracted personal data are not required to be encrypted with a security feature such that the extracted data may be accessed directly. Furthermore, it should be appreciated that the original security feature of each credential is different.

Upon deriving the security features, appropriate decryption is performed to ensure that the extracted biometric data and the extracted personal data can be properly read. The extracted biometric data and the extracted personal data, including the associated security features, may optionally be stored in system 20 in their original form. Alternatively, the extracted biometric and personal data, and associated security features, may optionally be stored in system 20 in any form where an encryption layer has been removed from the extracted biometric data and from the extracted personal data, or when further processing has been applied. It should be appreciated that in the exemplary embodiment the extracted biometric data and the extracted personal data are stored in system 20 such that they are associated with the security feature included in the original credential that the biometric and personal data were extracted from. Moreover, the identity of the individual corresponding to the extracted original biometric data, the extracted original biometric data itself, and any additional information required to verify the authenticity of, or required for access to, the extracted original biometric data may optionally be stored in system 20.

In the exemplary embodiment, the extracted biometric data may be used to derive additional data such as, but not limited to, biometric feature templates and confidence scores that may also optionally be stored in system 20. Biometric feature templates are a processed form of the extracted biometric data and constitute a computer generated template that includes at least one representation of a captured biometric feature. Specifically, the templates comprise a collection of summary data, extracted from captured biometric image or sample data. For example, summary data in the form of data points representing features present in a fingerprint may each be included, or listed, in the templates as coordinates (X, Y, θ).

The extracted biometric data is also used to determine a confidence score during authentication that reflects a level of trust in the authentication result based on a comparison match. That is, the extracted biometric data is compared against actual biometric data captured from a user such that a numerical score, based on the quality of the comparison match, is determined for at least one biometric comparison match. It should be appreciated that a numerical score based on the quality of a comparison match, may be determined for each of a plurality of different biometric comparison matches. Thus, a plurality of numerical scores may also be determined. The numerical scores for each comparison match are combined using any desirable mathematical computation to yield the confidence score, and the authentication is deemed trustworthy and an individual's identity confirmed when the confidence score is at least equal to a predetermined threshold value. It should be appreciated that the confidence scores are based on how well captured biometric features match against the extracted original biometric data.

By virtue of being at least equal to the predetermined threshold value, the confidence scores reflect an adequate level of trust in the authentication result. Moreover, it should be appreciated that trust in the authentication result increases as the number of biometric features compared increases. Furthermore, it should be appreciated that as the margin by which the confidence score exceeds the predetermined threshold increases, the trust in the authentication result also increases.

After reading and extracting the biometric and personal data 66 from the plurality of biometric credentials, the biometric data and the personal data 66 are processed 68 to generate a set of biometric data and a set of personal data respectively, by converting the extracted biometric and personal data into a universal format 68 such that the sets of data may be stored 70 on the biometric carrying device 54. After storing the sets of data, the process ends 72. It should be appreciated that the biometric data and the personal data extracted from each of the plurality of biometric credentials are included in the set of biometric data and the set of personal data, respectively, and are associated with the corresponding original security feature of the issuer of the original biometric credential.

In the exemplary embodiment, the universal format is an XML representation that contains data. However, it should be understood that in other embodiments, any type of computer-readable data containing format may be used that facilitates reading the sets of biometric data and personal data by trusted authenticating entities as described herein. By virtue of universally formatting the biometric data and personal data into sets of data, the sets of data can be used to facilitate confirming an individual's identity by any authorized authenticating entity. Moreover, by virtue of storing the set of biometric data in a universal format on a universal biometric carrying device 54, the universal biometric carrying device 54 constitutes a Universal Biometric Credential (UBC). Furthermore, the set of biometric data and the set of personal data constitute original Universal Biometric Credential (UBC) data. It should be understood that the set of biometric data includes the fingerprint and face data from the first credential, the iris data from the second credential, and the fingerprint and vascular data from the third credential. Additionally, the set of personal data includes the age personal data of the first credential, the phone number personal data of the second credential, and the birth date personal data of the third credential.

The original UBC data is also associated with labels that include information about the biometric and personal data extracted from each biometric credential, such as, but not limited to, the issuer of the credential, the issue date, the issue location, the credential type and an identifier of the original biometric credential. Moreover, it should be appreciated that biometric and personal data from a plurality of biometric credentials for an individual can be stored on the same universal biometric carrying device 54. Furthermore, it should be understood that additional biometric and personal data may be added to the original UBC data after initially assembling the original UBC data. Additionally, it should be appreciated that in other embodiments biometric data and personal data, included in the original UBC data, may be removed from the UBC data. It should also be appreciated that in the exemplary embodiment any authorized issuer may create or generate the original UBC data.

FIG. 4 is a diagram 74 that represents UBC data of the exemplary embodiment as configured and stored on the carrying device 54. Specifically, the diagram 74 includes the set of biometric data 76 and the set of personal data 78. As shown, the biometric and personal data extracted from the first credential are each separately associated with the security feature DIG. SIG. 1 that was also extracted from the first credential. Likewise, the biometric and personal data extracted from the second and third credentials are each separately associated with the security features extracted from their respective credentials. That is, the finger and face biometric data of the first credential is associated with a security feature in the form of digital signature 1 (DIG. SIG. 1), the iris biometric data of the second credential is associated with a security feature in the form of digital signature 2 (DIG. SIG. 2), and the finger and vascular biometric data of the third credential is associated with a security feature in the form of digital signature 3 (DIG. SIG. 3). Likewise, the age personal data of the first credential is associated with DIG. SIG. 1, the phone number personal data of the second credential is associated with DIG. SIG. 2, and the birth date personal data of the third credential is associated with DIG. SIG. 3. It should be appreciated that the security features associated with the biometric and personal data may be referred to as biometric security features and personal security features, respectively.

Because the digital signatures for the biometric data and personal data extracted from the same credential are the same in the exemplary embodiment, the digital signatures can be used to relate, or associate, the biometric data extracted from a credential to the personal data extracted from the same credential, and vice versa. As such, the digital signatures may constitute a logical link between the biometric data and the personal data extracted from a same credential. Such a logical link is provided when the digital signatures are validated, or verified as being trustworthy. Verifying that the digital signatures are trustworthy also certifies the associated biometric and personal data. Thus, when DIG. SIG. 1, DIG. SIG. 2 and DIG. SIG. 3 are verified as trustworthy, corresponding logical links L1, L2 and L3 are provided between the biometric data of the first, second and third credentials and the personal data of the first, second and third credentials, respectively.

Although verified digital signatures of the exemplary embodiment constitute a logical link between biometric and personal data extracted from the same credential, it should be appreciated that in other embodiments an additional security feature, in the form of an issuer digital signature, may be added to the biometric and personal data extracted from each credential such that the biometric data extracted from each credential is also associated with the personal data extracted from other credentials that are different from the same credential.

FIG. 5 is a diagram 80 that represents the original UBC data of another embodiment as configured and stored on the carrying device 54. Specifically, diagram 80 includes the original UBC data and associated digital signatures as shown in FIG. 4, as well as additional security features in the form of issuer digital signatures DIG. SIG. 4, DIG. SIG. 5, DIG. SIG. 6. Thus, each item of biometric data 76 is associated with a plurality of different security features. For example, the finger and face biometric data extracted from the first credential is associated with the security features DIG. SIG. 1 and DIG. SIG. 4. Issuer digital signature DIG. SIG. 4 is separately associated with the finger and face biometric data extracted from the first credential, and is separately associated with the phone number and birth date personal data extracted from the second and third credentials, respectively. It should be appreciated that by virtue of being separately associated with the biometric data extracted from the first credential and being separately associated with personal data extracted from the second and third credentials, when validated, DIG. SIG. 4 constitutes a logical link L4 between the biometric data extracted from the first credential and the personal data extracted from the second and third credentials. Consequently, issuer digital signature DIG. SIG. 4 associates the finger and face biometric data extracted from the first credential with the phone number and birth date personal data extracted from the second and third credentials, respectively. It should be understood that the issuer digital signature DIG. SIG. 4 associates the biometric data extracted from the first credential with personal data extracted from two credentials different than the first credential.

Similar to issuer digital signature DIG. SIG. 4, issuer digital signature DIG. SIG. 5 associates the iris biometric data extracted from the second credential with the age and birth date personal data extracted from the first and third credentials, respectively. Thus, issuer digital signature DIG. SIG. 5 associates the biometric data extracted from the second credential with personal data extracted from two different credentials. Likewise, issuer digital signature DIG. SIG. 6 associates the finger and vascular biometric data extracted from the third credential with the age and phone number personal data extracted from the first and second credentials, respectively. Thus, issuer digital signature DIG. SIG. 6 associates the biometric data extracted from the third credential with personal data extracted from two different credentials. Although the exemplary embodiment associates the biometric data extracted from one credential with personal data extracted from two different credentials, it should be appreciated that in other embodiments each of the issuer digital signatures DIG. SIG 4, DIG. SIG. 5, DIG. SIG. 6 may associate the biometric data extracted from one credential with the personal data extracted from any number of different credentials.

It should be understood that logical links L4, L5, L6 are provided when issuer digital signatures DIG. SIG. 4, DIG. SIG. 5, DIG. SIG. 6, respectively, are validated, or verified as being trustworthy. Verifying that the issuer digital signatures DIG. SIG. 4, DIG. SIG. 5, DIG. SIG. 6 are trustworthy also certifies the associated biometric and personal data. Thus, when DIG. SIG. 4, DIG. SIG. 5 and DIG. SIG. 6 are verified as trustworthy, corresponding logical links L4, L5 and L6 are provided such that biometric data extracted from one credential is associated with personal data extracted from all of the different credentials, and vice versa. Moreover, it should be understood that including issuer digital signatures DIG. SIG. 4, DIG. SIG. 5, DIG. SIG. 6 in the biometric data 76 and the personal data 78 facilitates providing additional security for the biometric 76 and personal data 78.

FIG. 6 is a simplified block diagram 82 illustrating exemplary relationships established during authentication between a user 84 in possession of a carrying device 54, the set of biometric data 76 included in the UBC data, and the set of personal data 78 included in the UBC data. Specifically, the user 84 is related to the biometric data 76 by way of a biometric link 86. The biometric link 86 is established and authenticated when there is a biometric match between biometric data captured from the user 84 and corresponding certified biometric data included in the set of biometric data 76. Consequently, it should be appreciated that by authenticating the biometric link 86 and providing a corresponding one of the logical links L1, L2 and L3, a logical link is effectively validated between the user 84 and the personal data 78.

Figure 7:
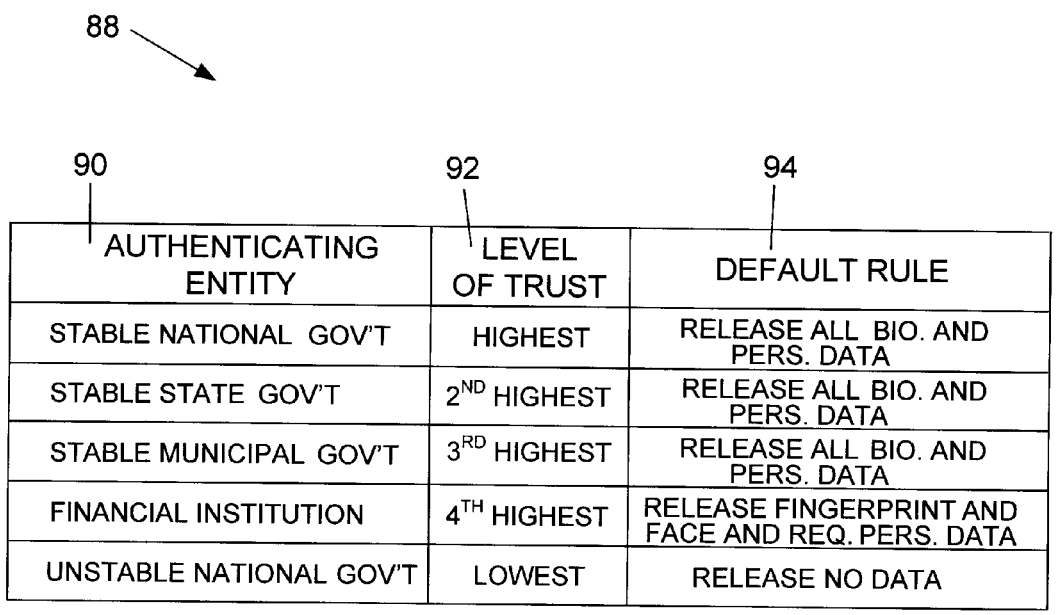
FIG. 7 is a diagram illustrating an exemplary user configurable policy.

FIG. 7 is a diagram illustrating an exemplary user configurable policy 88 that is stored in carrying device 54, and is for protecting access to the biometric data 76 and the personal data 78 included in the UBC data such that more trusted authenticating entities are granted access to at least a portion of the UBC data and less trusted authenticating entities are denied access to the UBC data. Specifically, the user configurable policy 88 includes the identities of a plurality of trusted authenticating entities 90, levels of trust 92 and default rules 94, such that each of the authenticating entities 90 is associated with one of the levels of trust 92 and is associated with one of the default rules 94. In the exemplary embodiment, the trusted authenticating entities 90 include stable national governments, stable state governments, stable municipal governments, financial institutions and unstable national governments. It should be appreciated that in other embodiments the trusted authenticating entities 90 may include any entity authorized to confirm the identity of a user as described herein.

The levels of trust 92 define categories or degrees of trust for each of the trusted authenticating entities 90 that vary from a highest level of trust to a lowest level of trust. In the exemplary embodiment, stable national governments are assigned a highest level of trust because stable national governments are generally considered to be the most trustworthy type of authenticating entity. Moreover, stable state and municipal governments are assigned a second and a third highest level of trust, respectively, because stable state and municipal government authenticating entities 90 are generally considered to be trustworthy. Financial institutions are assigned a fourth highest level of trust, and unstable national governments of third world countries are assigned a lowest level of trust because authenticating entities 90 of unstable national governments of third world countries are generally considered to be the least trustworthy.

It should be understood that in the exemplary embodiment the user configurable policy 88 is generated by associating each of a plurality of authenticating entities 90 with one of the levels of trust 92. After associating each of the authenticating entities 90 with one of the levels of trust 92, an appropriate one of a plurality of default rules 94 is associated with each of the authenticating entities 90. Specifically, an appropriate one of the default rules 94 is associated with each particular authenticating entity 90 that corresponds to the level of trust 92 previously associated with a particular authenticating entity 90.

Moreover, it should be appreciated that the default rules 94 are configured to release a predetermined portion of the UBC data in accordance with a corresponding one of the levels of trust 92 associated with the particular authenticating entity 90. For example, default rules 94 may indicate that all biometric data and all personal data requested by a national authenticating entity 90 is to be released from the UBC data to the stable national government authenticating entity 90. Moreover, default rules 94 may indicate that fingerprint and face biometric data, and the requested personal data, are to be released from the UBC data to a financial institution authenticating entity 90. Furthermore, the default rules 94 may indicate that no data is to be released from the UBC data to the unstable national government authenticating entity 90.

It should be understood that in the exemplary embodiment, the user of a carrying device 54 may configure the policy 88 by defining the default rules 94 and the levels of trust 92 in any desirable manner that facilitates authentication as described herein. Moreover, the user of a carrying device 54 may reconfigure the policy 88 by changing the definitions of the default rules 94 and levels of trust 92. For example, the user may reconfigure the default rule 94 for a stable national government authenticating entity 90 such that the carrying device 54 releases only face biometric data and the requested personal data from the UBC data to stable national government authenticating entities 90, instead of all requested biometric data and the requested personal data. Furthermore, the user of a carrying device 54 may reconfigure the policy 88 so that the user is prompted to manually approve any release of data, before that data is released. Although the exemplary embodiment includes one user configurable policy 88 stored in the carrying device 54, it should be appreciated that in other embodiments any number of user configurable policies 88 may be generated and stored in the carrying device 54.

When confirming the identity of the user 84, authenticating entities 90 establish that the provided biometric data is trustworthy and has not been modified by determining a biometric data level of trust using an authentication configurable policy. The authentication configurable policy constitutes a list of security features and a set of authentication default rules stored in the authentication workstation 48. Moreover, similar to the user configurable policy 88 used to control access to the UBC data, the authentication configurable policy defines trustworthiness levels for security features that vary from the most trustworthy to the least trustworthy, and assigns levels of trust accordingly. For example, security features associated with a stable national government may be assigned a highest level of trust, security features associated with stable state or provincial governments may be assigned a second highest level of trust, security features associated with stable municipal governments may be assigned a third highest highest level of trust, security features associated with financial institutions may be assigned a fourth highest level of trust, and security features associated with unstable national governments of third world countries may be assigned a lowest level of trust.

Each authentication default rule in the exemplary embodiment is configured to accept biometric data and personal data based on the level of trust assigned to the corresponding security feature. For example, the authentication default rule for security features having a highest level of trust, as issued by stable national governments, may indicate that all biometric data and all personal data associated with such security features are acceptable for authentication. However, the authentication default rule for security features having a lowest level of trust, as issued by unstable national governments, may indicate that biometric data and personal data associated with such security features are not acceptable for authentication.

It should be understood that in the exemplary embodiment, the authenticating entity may configure the authentication policy by defining the authentication default rules and the levels of trust in any desirable manner that facilitates confirming the identity of a user as described herein. Moreover, the authenticating entity may reconfigure the authentication policy by changing the definitions of the authentication default rules and levels of trust. For example, the authenticating entity may reconfigure the authentication default rule for security features having a highest level of trust such that only security features issued by the United States Federal Government have a highest level of trust and are acceptable for authentication, instead of security features issued by all stable national governments having a highest level of trust. Although the exemplary embodiment includes an authentication policy to determine which security features and associated biometric data are acceptable for authentication, it should be appreciated that in other embodiments any method may be used to assign levels of trust to the security features that facilitate confirming the identity of a user as described herein. Furthermore, although the exemplary embodiment includes one authentication policy, it should be appreciated that in other embodiments any number of authentication policies may be generated and stored in the authentication workstation 48. Additionally, the authenticating entity 90 may reconfigure the authentication policy to manually prompt security personnel for approval of a security feature received from a carrying device 54.

Figure 8:
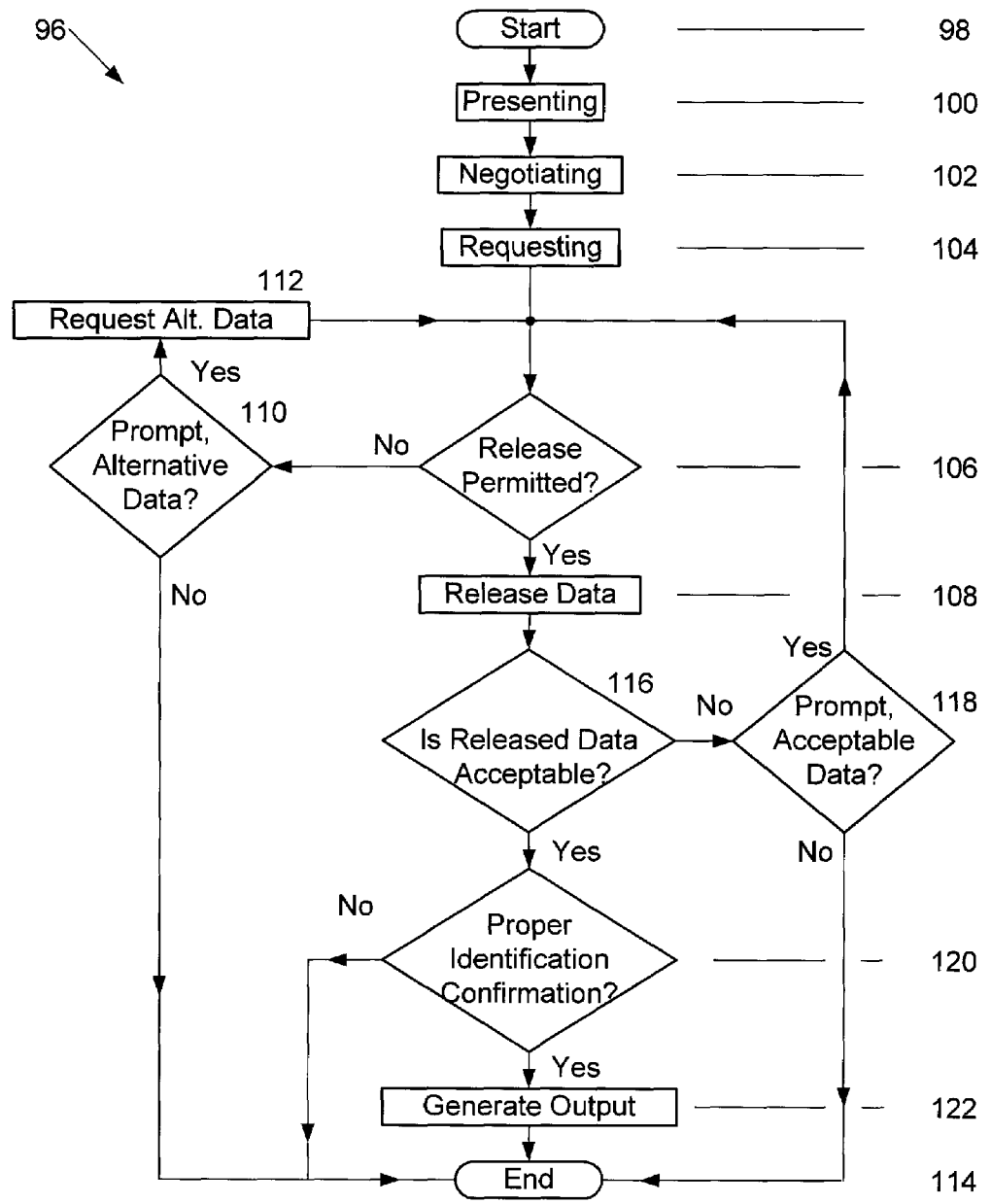
FIG. 8 is a flowchart illustrating an exemplary process for confirming the identity of a user in possession of a universal biometric credential.

FIG. 8 is a flowchart 96 illustrating an exemplary process for confirming the identity of a user 84 in possession of a carrying device 54 by authenticating the biometric link 86 with an item of certified biometric data included in the set of biometric data 76, and by providing a corresponding one of the links L1, L2, L3. In the exemplary embodiment, an authenticating entity 90 (not shown) performs authentication at an authentication workstation 48, such that authentication occurs between an authenticating entity 90 and the user.

The process starts 98 with a user 84 in possession of a UBC carrying device 54 presenting 100 the UBC carrying device 54 to an authenticating entity to begin negotiating 102 between the carrying device 54 and the authenticating entity 90. Negotiating 102 is for determining biometric data, included in the UBC data, that corresponds to at least one biometric feature desired to be used for authenticating the biometric link 86. Specifically, after the carrying device 54 is presented to the authenticating entity 100, the authenticating entity 90 automatically starts negotiating 102 by requesting 104 at least one item of biometric data included in the UBC data that the authenticating entity will accept for authentication, and by requesting 104 personal data that is desired to be proven and that corresponds to the at least one item of biometric data. As part of the request 104 for biometric and personal data, the authenticating entity 90 stipulates that biometric data and personal data acceptable for authentication are to be associated with a same security feature issued by an issuer suitable to the authenticating entity 90. It should be understood that data acceptable for authentication is to be associated with a security feature that can be validated to ensure that the security feature itself is trustworthy. Ensuring that the security feature itself is trustworthy also ensures, or certifies, that the original biometric and personal data are trustworthy, have not been modified and were issued in an original credential by a stated issuer. Thus, biometric data associated with a trustworthy security feature constitutes certified biometric data. Moreover, personal data associated with a trustworthy security feature constitutes certified personal data. It should be appreciated that by virtue of being determined trustworthy, the security feature associated with the biometric data and tile corresponding personal data, constitutes a corresponding one of the logical links L1, L2, L3.

In response to the request 104 for biometric and personal data, the carrying device 54 consults the user configurable policy 88 to determine whether the default rule 94 corresponding to the requesting authenticating entity 90 permits releasing the requested data from the UBC data. When the appropriate default rule 94 permits releasing 106 the requested biometric and personal data, the carrying device 54 releases 108 the requested biometric 76 and personal data 78 from the UBC data to the authenticating entity 90. Otherwise, when the appropriate default rule 94 does not permit releasing 106 the requested biometric and personal data, the carrying device 54 prompts 110 the authenticating entity 90 to select from alternative biometric data and personal data 110 that the appropriate default rule 94 permits releasing from the UBC data. If the authenticating entity 90 accepts the prompt 110, the authenticating entity requests 112 the alternative biometric data and personal data, the carrying device 54 consults the appropriate default rule 94 for permission to release 106 the data, and then the carrying device 54 releases the data 108. However, if the authenticating entity 90 does not accept the prompt 110, the process ends 114.

After the biometric data and personal data are released 108 from the UBC data to the authenticating entity 90, the authenticating entity 90 analyzes the released biometric and personal data, and associated security feature, to determine whether or not the released biometric and personal data are acceptable 116. Specifically, the authenticating entity 90 verifies that the released biometric and personal data correspond to the requested biometric feature and personal data, respectively. Moreover, the authenticating entity 90 validates the associated security feature to verify that the biometric and personal data were issued by a suitable issuer, and to verify that the released biometric and personal data are certified.

Otherwise, if the released biometric data and personal data do not correspond to the desired, or requested, biometric feature and personal data, respectively, the released data is not acceptable 116. Moreover, if the authenticating entity 90 cannot validate the security feature, the released biometric and personal data are not acceptable 116. Furthermore, it should be appreciated that when the security feature cannot be validated evidence of a link between the requested biometric and personal data cannot be provided. The authenticating entity then prompts 118 the carrying device 54 for the same data as originally requested 104. If the carrying device 54 contains such information 118 and the appropriate default rule 94 permits releasing it 106, the carrying device 54 releases 108 the requested biometric and personal data, and associated security feature, to the authenticating entity 90. Otherwise, the process ends 114.

In the exemplary embodiment, after the authenticating entity 90 determines that the released data is acceptable 116, the identity of the user in possession of the carrying device 54 is confirmed 120. During confirmation, initially, actual biometric data of the user corresponding to the released biometric data is electronically captured. For example, face biometric data of the user may be electronically captured by the authenticating entity 90 and compared against released face biometric data. The confidence score is determined based on the biometric comparison match.

When the confidence score is at least equal to a predetermined threshold value, the biometric link 86 is authenticated. Upon authenticating the biometric link 86 and validating the security feature, the identity of the user in possession of the device 54 is properly confirmed 120 and an output is generated 122. In the exemplary embodiment, the output 122 constitutes a message on the monitor that includes the confidence score, an identification result showing whether the authentication succeeded or failed, and may include personal data. However, it should be appreciated that in other embodiments the generated output 122 may constitute any action that indicates a result of the identification confirmation 120. Such actions include, but are not limited to, opening a physical access barrier, providing logical access and any other kind of automated action in addition to or in place of the message. After generating the output 122, the process ends 114.

Otherwise, if the confidence score is less than the predetermined threshold value, the identity of the user is not properly confirmed, and the process ends 114.

In an example illustrating the exemplary process 96, after a carrying device 54 has been presented 100, a stable national government authenticating entity 90 requests 104 face biometric authentication of the biometric link 86 with certified evidence of a face-age link, that is, logical link L1, from a stable national government. In response, the carrying device 54 consults the user configurable policy 88 stored therein to determine whether or not the requested biometric and personal data are permitted to be released 106 from the UBC data. Specifically, the carrying device 54 consults the policy 88 and determines that the appropriate default rule 94 permits releasing all requested biometric data and all requested personal data from the UBC data to stable national government authenticating entities 90. Thus, the carrying device 54 selects the requested face biometric data and age personal data, as well as the security feature DIG. SIG 1 associated with the face biometric data and age personal data, to release 108 to the stable national government authenticating entity 90.

Initially, the authenticating entity 90 consults the authenticating default rule corresponding to the security feature DIG. SIG. 1 and determines that the authentication default rule for security features from stable national governments indicates that all biometric data and all personal data associated with the security feature DIG. SIG. 1 are acceptable for authentication. Moreover, the authenticating entity 90 determines that the security feature, DIG. SIG. 1, associated with the released face biometric data is from a suitable issuer by validating the security feature DIG. SIG. 1. The authenticating entity 90 also validates the security feature DIG SIG. 1 to ensure that the security feature itself is trustworthy. By validating the security feature DIG. SIG. 1, the authenticating entity 90 certifies that the released face biometric data and the released personal data are trustworthy, have not been modified, and were issued in an original credential by a stable national government, that is, a stated suitable issuer. Moreover, by validating the security feature, the validated security feature constitutes the logical link L1 which constitutes the certified evidence of the face-age link requested by the stable national government authenticating entity 90.

Face biometric data is electronically captured from the user and is compared against the released face biometric data. Link 86 is successfully authenticated because the confidence score is determined to be at least equal to the predetermined threshold value. Because the biometric link 86 was successfully authenticated using face biometric data and because the validated security feature was provided as certified evidence of the face-age link, the identity of the user in possession of the device 54 is properly confirmed 120.

It should be appreciated that although the above described example electronically captures face biometric data of the user, in other embodiments, biometric data representing any feature of the user in possession of the carrying device 54 may be electronically captured and used for comparison against corresponding biometric UBC data. Moreover, it should be appreciated that in other embodiments, a plurality of different biometric features of the user may be compared against corresponding biometric data included in the UBC data to authenticate link 86. Furthermore, it should be appreciated that different biometric data representing a same biometric feature may be included in the UBC data, and each of the different biometric data may be compared against the captured biometric data during authentication of link 86. For example, when the requested biometric data is fingerprint data, the fingerprint data included in the UBC data that was originally obtained from both the first and third credentials may be compared against fingerprints captured during authentication of link 86. In situations where a single fingerprint is captured, if the first and third credential fingerprint data both represent the single captured fingerprint, they can both be compared against the captured fingerprint. Moreover, in situations where a plurality of fingerprints are captured, if the first and third credential fingerprint data represent different captured fingerprints, they can each be compared against the corresponding captured fingerprint.

Although biometric data is electronically captured from the user during authentication of link 86 in the exemplary embodiment, it should be appreciated that in other embodiments biometric data is not electronically captured from the user. In other embodiments security personnel of the authenticating entity may manually compare the user in possession of the device 54 against biometric data of the user to authenticate the link 86.

Moreover, it should be understood that in other embodiments, the authenticating entity may use electronic security features associated with issuers of the original biometric credential data, and additional electronic security features added by other issuers, verifiers or users subsequent to initially assembling the original UBC data, as the basis for authentication. Furthermore, it should be appreciated that security may be facilitated to be enhanced by combining biometric identity data electronically captured by many different independent authenticating entities as the biometric UBC data, and by adding additional electronic security features to relevant parts of the UBC data that relate to other independent authenticating entities that have authenticated the user in possession of the device 54 using the relevant parts of the UBC data.

Although the exemplary embodiment uses biometric data to prove the identity of the user in possession of the carrying device 54, it should be understood that in other embodiments non-biometric techniques may be used. Such techniques include, but are not limited to, entering a user personal identification number (PIN) or user password into the carrying device 54 for authentication. Thus, it should be appreciated that any technique may be used that facilitates properly confirming the identity of a user in possession of a carrying device 54.

In the exemplary embodiment, the negotiations 102 occur automatically between the carrying device 54 and the authentication workstation 48, which workstation 48 is operated by the authenticating entity 90 at the authenticating station. Although the negotiations 102 are automatically performed in the exemplary embodiment, it should be appreciated that in other embodiments the negotiations 102 may be performed manually between the user in possession of the device 54 and security personnel at the authentication station. For example, in other embodiments, security personnel may cause a prompt to appear on a screen of the carrying device 54 that causes the user to accept or reject releasing the requested biometric data and personal data from the UBC data. In response, the user may click on the icon to release the requested information. It should be appreciated that the prompt may include, but not be limited to, an icon and a voice message requesting the user to accept or reject releasing the requested biometric data.

It should be appreciated that the carrying device 54, including the UBC data, may be substituted for any credential containing electronic data. For example, the device 54 may be substituted for special membership cards such as registered traveler program cards and private membership cards. Substituting the carrying device 54 for credentials containing electronic information facilitates allowing individuals to carry fewer separate credentials and facilitates reducing the likelihood of losing credentials. Moreover, it should be appreciated that the carrying device 54 may be used for singular verifications such as proving identity to a police officer at a traffic stop, and proving age to purchase merchandise or to enter certain restricted premises. Because the UBC is a collection of electronic data that can be easily and securely backed up, there are few negative consequences as a result of losing the carrying device 54.

Although original biometric credentials are collected and processed to create the UBC data for an individual in the exemplary embodiment, it should be appreciated that in other embodiments multiple original biometric credentials of a plurality of individuals, or of a group of associated individuals, may be collected and included in the same UBC data. For example, in a group of associated individuals such as a family, the biometric credentials of each family member may be processed and included in UBC data stored on the same UBC carrying device 54. When performing a group activity such as traveling, a responsible member of the family, usually a parent, may carry the UBC carrying device 54 such that other family members are not required to carry their own multiple biometric credentials. Thus, the UBC carrying device 54 may be used to facilitate reducing authentication problems that may develop should a family member lose his or her own personal biometric credentials.

The above-described methods and systems facilitate reducing the need to carry several different original biometric credentials by transforming an existing personal device into a universal biometric credential. Specifically, the biometric and personal data included in a plurality of different biometric credentials may be extracted and used to create a set of biometric data and a set of personal data. The sets of data may be converted into a universal format such that the sets of data may be stored on a carrying device. As a result of storing the set of biometric data in the universal format on a carrying device, the carrying device may be easily transformed into a universal biometric credential (UBC). Moreover, the above-described methods and systems facilitate accurately confirming the identity of a user in possession of the carrying device using only the biometric and personal data contained within the carrying device. Furthermore, the above-described methods and systems protect access to biometric and personal data contained within the UBC device by releasing biometric and personal data to an authenticating entity only in accordance with a user configurable policy. By authenticating a biometric link between the user and an item of certified biometric data stored in the carrying device, as well as providing certified evidence of a link between the biometric data and desired personal data also stored in the carrying device, the methods and system described herein facilitate using the carrying device as a Universal Biometric Credential to confirm the identity of the user.

In each embodiment, the method of creating the UBC and authenticating identities using the UBC carrying device facilitates reducing the number of different biometric credentials carried by individuals, facilitates reducing the costs and requirements for secondary issuers of biometric credentials to enroll separate versions of a subject's biometrics, and facilitates removing the need to perform identification (1:N) background searches. Moreover, in each embodiment, the method facilitates reducing the number of different biometric credentials that are to be carried by combining multiple biometric credentials into a single set of biometric credentials, and by converting the single set of biometric credentials into a universal format that may be stored on an existing personal device. As a result, secondary issuers of biometric credentials are not required to create separate biometric credentials including separate versions of a subject's biometrics, and individuals are not required to carry multiple credentials. Accordingly, because a large number of original biometric credentials may be included on a single biometric credential and easily used for comparison, the likelihood that an authentication is proper is facilitated to increase because as the number of compared biometric features increases, the likelihood that an authentication is proper also increases. Moreover, security is facilitated to be enhanced by combining the biometric identity data captured by many different independent entities and by adding additional electronic security features to relevant parts of the UBC data from other independent entities who have verified the user in possession of the UBC carrying device as the owner of the UBC data using the relevant parts of the UBC data.

Furthermore, the present invention can be implemented as a program stored on a computer-readable recording medium, that causes a computer to execute the methods described herein to create UBC data and to authenticate a user in possession of a UBC carrying device as the owner of the UBC data. The program can be distributed via a computer-readable storage medium such as, but not limited to, a CD-ROM.

While the invention has been described in terms of various specific embodiments, those skilled in the art will recognize that the invention can be practiced with modification within the spirit and scope of the claims.

What is claimed is:

1. A method of confirming the identity of a user comprising:
    collecting a plurality of biometric credentials from an individual;
    extracting biometric data, personal data and an original security feature corresponding to the biometric and personal data from each of the biometric credentials, wherein the original security feature for each credential is different;
    processing the extracted biometric and personal data to generate a set of biometric data and a set of personal data, respectively, by converting the extracted biometric and personal data into a computer-readable data containing format such that the original security feature corresponding to the biometric and personal data extracted from a same credential is separately associated with the corresponding biometric data as a biometric security feature and is separately associated with the corresponding personal data as a personal security feature;
    storing the set of biometric data and the set of personal data in a device as device data;
    associating an additional security feature with an item of biometric data included in the set of biometric data and associating the additional security feature with at least one item of personal data included in the set of personal data, wherein the at least one item of personal data is from a different credential than the item of biometric data;
    generating a user configurable policy comprising identities of a plurality of authenticating entities, each of the authenticating entities being associated with one of a plurality of levels of trust and a default rule corresponding to the one level of trust, wherein the default rule is one of a plurality of default rules that permit releasing a portion of the device data in accordance with a corresponding one of the levels of trust;
    storing the user configurable policy in the device;
    presenting, by a user in possession of the device, the device to one of the authenticating entities at an authentication station;
    requesting biometric and personal data of the user from the device data, the biometric data corresponding to at least one biometric feature desired for authenticating the user, said requesting operation being performed by a workstation of the one authenticating entity;
    consulting the user configurable policy in response to said requesting operation to determine whether the requested biometric data is permitted to be released from the device data;
    releasing the requested biometric and personal data from the device data to the one authenticating entity when the default rule associated with the one authenticating entity permits releasing the requested biometric and personal data;
    validating a logical link between the user in possession of the device and the released personal data by establishing a logical link between the released personal data and the released biometric data by certifying that a biometric security feature associated with the released biometric data and a personal security feature associated with the released personal data have not been modified and were issued in an original credential by a suitable issuer, and authenticating a biometric link between the user and the released biometric data by comparing the released biometric data against actual biometric data captured from the user in possession of the device; and
    generating an output after said validating operation indicating a result of said validating operation.

2. A method of confirming the identity of a user in accordance with claim 1, wherein the released biometric data is released from the set of biometric data and the released personal data is released from the set of personal data.

3. A method of confirming the identity of a user in accordance with claim 1, said authenticating operation comprising:
    determining a numerical score for each of a plurality of different biometric comparison matches, wherein each numerical score is based on a quality of corresponding biometric comparison matches;

calculating a confidence score by combining the numerical scores; and confirming the identity of the user when the confidence score is at least equal to a predetermined threshold value.

4. A method of confirming the identity of a user in accordance with claim 1, further comprising prompting the one authenticating entity to select from alternative biometric data and personal data that an appropriate default rule permits releasing from the device data, when the appropriate default rule does not permit releasing the requested biometric and personal data from the device data.

5. A method of confirming the identity of a user in accordance with claim 1, further comprising prompting the device to release the requested biometric and personal data after determining that the biometric data and the personal released by the device are not in accordance with said requesting operation such that the released biometric and personal data are not acceptable for authentication by the authenticating entity.

6. A system for confirming the identity of a user comprising:

at least one computer configured as a server, said server comprising a processor and a database said processor being configured to extract biometric data, personal data and an original security feature corresponding to the biometric and personal data from each of a plurality of biometric credentials collected from an individual, wherein the original security feature for each credential is different, process the extracted biometric and personal data to generate a set of biometric data and a set of personal data, respectively, by converting the extracted biometric and personal data into a computer-readable data containing format such that the original security feature corresponding to the biometric and personal data extracted from a same credential is separately associated with the corresponding personal biometric security feature and is separately associated with the corresponding personal data as a personal security feature, and associate an additional security feature with at least one item of biometric data included in the set of biometric data and associate the additional security feature with at least one item of personal data included in the set of personal data, wherein the at least one item of personal data is from a different credential that the at least one item of biometric data;

a device having stored therein the set of biometric data and the set of personal data as device data, wherein each item of biometric data included in the set of biometric data corresponds to an item of personal data included in the set of personal data, said device being configured to store a user configurable policy comprising identities of a plurality of trusted authenticating entities, each of the trusted authenticating entities being associated with one of a plurality of levels of trust and a default rule corresponding to the one level of trust, the default rule being one of a plurality of default rules that permit releasing a portion of the device data in accordance with a corresponding one of the levels of trust, wherein each item of biometric data includes at least one representation of a biometric feature of an individual; and at least one workstation positioned at an authenticating station, said workstation comprising at least a workstation computer operationally coupled to a biometric credential reading device, wherein said server and said at least one workstation communicate and wherein said at least one workstation is configured to at least request biometric and personal data of a user in possession of said device from said device data when the user presents said device to said at least one workstation, the biometric data corresponding to at least one biometric feature desired to be used for authenticating the user, said device is further configured to consult the user configurable policy in response to the request for biometric and personal data, to determine whether the requested biometric and personal data are permitted to be released from the device data, and to release the requested biometric and personal data from the device data to an authenticating entity when an appropriate one of the default rules associated with the authenticating entity permits releasing the requested biometric and personal data, and said at least one workstation is further configured to validate a logical link between the user and personal data released by said device by establishing a logical link between the personal data and biometric data released by said device by certifying that the biometric security feature associated with the released biometric data and the personal security feature associated with the released personal data have not been modified and were issued in an original credential by a suitable issuer, and authenticating a biometric link between the user and the released biometric data by comparing the released biometric data against actual biometric data captured from the user, and generate an output indicating whether or not the logical link between the user and the released personal data is valid.

7. A system for confirming the identity of a user in accordance with claim 6, wherein the released biometric data is released from the set of biometric credential data and the released personal data is released from the set of personal data.

8. A system for confirming the identity of a user in accordance with claim 6, wherein said device is further configured to change the levels of trust associated with corresponding trusted authenticating entities and to change the default rules corresponding to the levels of trust in response to user input.

9. A system for confirming the identity of a user in accordance with claim 6, wherein said device is further configured to prompt said workstation to select from alternative biometric data and personal data that an appropriate default rule permits releasing from said device data, when the appropriate default rule does not permit releasing the requested biometric and personal data from said device data.

10. A system for confirming the identity of a user in accordance with claim 6, wherein said workstation is further configured to prompt said device to release the requested biometric and personal data after determining that the biometric data and the personal data released by said device are not in accordance with the request for biometric and personal data such that the released biometric and personal data are not acceptable for authentication by the trusted authenticating entity.

11. A universal biometric credential device for confirming the identity of a user at an authenticating station, said universal biometric credential device comprising:

a computer-readable recording medium configured to store a user configurable policy, a set of biometric data and a set of personal data, wherein the user configurable policy comprises identities of a plurality of trusted authenticating entities, each of the trusted authenticating entities being associated with one of a plurality of levels of trust and a default rule corresponding to the one level of trust, the default rule being one of a plurality of default rules that permit releasing a portion of the device data in accordance with a corresponding one of the levels of trust, wherein each item of biometric data includes at least one representation of a biometric feature of an individual, and each item of biometric data included in the set of biometric data corresponds to an item of personal data included in the set of personal data; and a device processor configured to receive a request from each of the trusted authenticating entities for biometric and personal data stored in said universal biometric credential device, configured to consult the user configurable policy in response to the request to determine whether the requested biometric and personal data are permitted to be released from said universal biometric credential device, and configured to release the requested biometric and personal data from said universal biometric credential device when an appropriate one of the default rules permits releasing the requested biometric and personal data, wherein said universal biometric credential device communicates with at least one workstation positioned at an authentication station of each of the authenticating entities, the at least one workstation comprises at least a workstation computer operationally coupled to a biometric credential reading device and is operable to communicate with a server, request biometric and personal data of a user in possession of said universal biometric credential device from the device data when the user presents said universal biometric credential device to the at least one workstation, the biometric data corresponding to at least one biometric feature desired to be used for authenticating the user, validate a logical link between the user and personal data released by said universal biometric credential device by establishing a logical link between the personal data and biometric data released by said universal biometric credential device by certifying that the biometric security feature associated with the released personal data have not been modified and were issued in an original credential by a suitable issuer, and authenticating a biometric link between the user and the released biometric data by comparing the released biometric data against actual biometric data captured from the user, and generate an output indicating whether or not the logical link between the user and the released person data is valid, the server comprises a server processor and a database, wherein the server processor is operable to extract biometric data, personal data and an original security feature corresponding to the biometric and personal data from each of a plurality of biometric credentials collected from an individual, wherein the original security feature for each credential is different, process the extracted biometric and personal data to generate the set of biometric data and the set of personal data, respectively, by converting the extracted biometric and personal data into a computer-readable data containing format such that the original security feature corresponding to the biometric and personal data extracted from a same credential is separately associated with the corresponding biometric data as a biometric security feature and is separately associated with the corresponding personal data as a personal security feature, and associate an additional security feature with at least one item of biometric data included in the set of biometric data and associate the additional security feature with least one item of personal data included in the set of personal data, wherein the at least one item of personal data is from a different credential that the at least one item of biometric data.

12. The universal biometric credential device in accordance with claim 11, wherein said device processor is further configured to prompt each of the trusted authenticating entities to select from alternative biometric and personal data that the appropriate one of the default rules permits releasing from said universal biometric credential device, when the appropriate one of the default rules does not permit releasing the requested biometric and personal data from said universal biometric credential device.

13. The universal biometric credential device in accordance with claim 11, wherein said universal biometric credential device is further configured to change the levels of trust associated with corresponding trusted authenticating entities and to change the default rules corresponding to the levels of trust in response to user input.

14. The universal biometric credential device in accordance with claim 11, wherein the released biometric data is released from the set of biometric credential data and the released personal data is released from the set of personal data.

15. The universal biometric credential device in accordance with claim 11, wherein the workstation is further operable to prompt said universal biometric credential device to release the requested biometric and personal data after determining that the biometric data and the personal data released by said universal biometric credential device are not in accordance with the request for biometric and personal data such that the released biometric and personal data are not acceptable for authentication by the trusted authenticating entity.

* * * * *